United States Patent
Liu

(10) Patent No.: US 12,015,572 B2
(45) Date of Patent: Jun. 18, 2024

(54) COMMUNICATION METHOD AND COMMUNICATIONS APPARATUS

(71) Applicant: HUAWEI TECHNOLOGIES CO., LTD., Guangdong (CN)

(72) Inventor: Jianqin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 540 days.

(21) Appl. No.: 17/213,559

(22) Filed: Mar. 26, 2021

(65) Prior Publication Data

US 2021/0218525 A1 Jul. 15, 2021

Related U.S. Application Data

(63) Continuation of application No. PCT/CN2019/108445, filed on Sep. 27, 2019.

(30) Foreign Application Priority Data

Sep. 28, 2018 (CN) .......................... 201811138036.0

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04L 5/0053* (2013.01); *H04W 68/005* (2013.01); *H04W 72/23* (2023.01)

(58) Field of Classification Search
CPC ... H04L 5/0048; H04L 5/0053; H04L 5/0007; H04L 5/005; H04B 7/0626; H04W 68/005; H04W 72/23
See application file for complete search history.

(56) References Cited

U.S. PATENT DOCUMENTS

2016/0227427 A1   8/2016   Vajapeyam et al.
2017/0070312 A1   3/2017   Yi et al.
(Continued)

FOREIGN PATENT DOCUMENTS

CN   105101280 A   11/2015
CN   106411805 A   2/2017
(Continued)

OTHER PUBLICATIONS

3GPP TSG RAN WG1#81; R1-152692 ; Source: Panasonic; Title: DRS design for LAA; Fukuoka, Japan, May 25-29, 2015. (Year: 2015).*

(Continued)

*Primary Examiner* — Mohammed S Chowdhury

(57) ABSTRACT

A communication method and a communications apparatus are disclosed. The method includes: receiving a discovery reference signal from a network device, where the discovery reference signal includes one or more first signals and one or more second signals, and the one or more first signals include at least a common signal block or a channel state information-reference signal (CSI-RS). The one or more first signals may be used to carry configuration information of the one or more second signals, or configuration information of the discovery reference signal may be received from the network device. The corresponding apparatus is also disclosed. By virtue of the disclosed communication method and apparatus, composition of the discovery reference signal can be accurately indicated, to avoid frequent channel discovery, and improve resource utilization efficiency of the discovery reference signal.

17 Claims, 7 Drawing Sheets

(51) Int. Cl.
*H04W 68/00* (2009.01)
*H04W 72/23* (2023.01)

(56) References Cited

U.S. PATENT DOCUMENTS

| | | | | |
|---|---|---|---|---|
| 2017/0164325 | A1* | 6/2017 | Ekemark | H04W 72/23 |
| 2017/0223561 | A1 | 8/2017 | Radulescu et al. | |
| 2018/0242276 | A1* | 8/2018 | Patel | H04L 5/0048 |
| 2019/0007931 | A1* | 1/2019 | Harada | H04W 48/08 |
| 2019/0059012 | A1* | 2/2019 | Nam | H04W 72/0453 |
| 2019/0238290 | A1* | 8/2019 | Liu | H04L 5/005 |
| 2021/0007085 | A1* | 1/2021 | Lin | H04L 5/0053 |
| 2021/0153107 | A1* | 5/2021 | Xu | H04L 5/005 |
| 2021/0176687 | A1* | 6/2021 | Ko | H04L 5/0053 |
| 2021/0212079 | A1* | 7/2021 | Tang | H04W 72/23 |
| 2021/0320833 | A1* | 10/2021 | Kim | H04W 48/10 |
| 2021/0321331 | A1* | 10/2021 | Zhou | H04W 72/23 |
| 2021/0328738 | A1* | 10/2021 | Mondal | H04W 72/20 |
| 2021/0377883 | A1* | 12/2021 | Jung | H04W 48/10 |

FOREIGN PATENT DOCUMENTS

| | | |
|---|---|---|
| CN | 106576009 A | 4/2017 |
| CN | 104968052 B | 5/2017 |
| CN | 106686604 A | 5/2017 |
| CN | 108111276 A | 6/2018 |
| CN | 108366423 A | 8/2018 |
| WO | 2018129319 A1 | 7/2018 |

OTHER PUBLICATIONS

3GPP TSG RAN WG1 Meeting 91; R1-1720621; Source: InterDigital Inc.; Title: On Remaining Details of Synchronization Signal Designs; Reno, USA, Nov. 1-27, 2017 (Year: 2017).*
3GPP TSG RAN WG1 Meeting 94; R1-1809822; Source: Motorola Mobility, Lenovo; Title: Feature lead summary for NR-U DL Signals and Channels; Gothenburg, Sweden, Aug. 20-24, 2018. (Year: 2018).*
TSG RAN1, Study on NR-based Access to Unlicensed Spectrum. 3GPP TSG RAN meeting #81, Gold Coast, Australia, Sep. 10-13, 2018, RP-181704, 8 pages.
Office Action dated Feb. 20, 2021, issued in CN Application No. 201811138036.0, 14 pages.
International Search Report and Written Opinion dated Dec. 27, 2019, issued in CN Application No. PCT/CN2019/108445, 8 pages.
Xie Yunzhou et al: "The evolution of NB-IoT standard system and development of Internet of things industry", vol. 2, No. 1, Mar. 2018, total 14 pages.
Georges Kaddoum et al: "Design of Simultaneous Wireless Information and Power Transfer Scheme for Short Reference DCSK Communication Systems", IEEE Transactions on Communications, vol. 65, No. 1, Jan. 2017, total 13 pages.
Notice of Allowance issued in CN201811138036.0, dated Oct. 11, 2021, 4 pages.
Charter Communications: Si Transmission in NR-U, 3GPP Draft: R1-1809179, Aug. 11, 2018, XP051516549, total 4 pages.
Motorola Mobility et al: Feature lead summary for NR-U DL Signals and Channels, 3GPP Draft: R1-1809822, Aug. 23, 2018, XP051517179, total 14 pages.
Extended European Search Report issued in EP 198647869, dated Nov. 3, 2021, 3 pages.

* cited by examiner

COMMUNICATION METHOD AND COMMUNICATIONS APPARATUS

CROSS-REFERENCE TO RELATED APPLICATIONS

This application claims is a continuation of International Application No. PCT/CN2019/108445, filed on Sep. 27, 2019, which claims priority to Chinese Patent Application No. 201811138036.0, filed on Sep. 28, 2018. The disclosures of the aforementioned applications are hereby incorporated by reference in their entireties.

TECHNICAL FIELD

This application relates to the communications field, and in particular, to a communication method and a communications apparatus.

BACKGROUND

Cell search begins with a synchronization procedure. In this procedure, two specially designed physical signals broadcast by each cell are detected: a primary synchronization signal (PSS) and a secondary synchronization signal (SSS), so that a terminal device is synchronized with the cell in time and frequency. A physical identifier of the cell is also provided for the terminal device. In an initial synchronization process after the synchronization signals are detected, the terminal device decodes a physical broadcast channel (PBCH) to obtain key system information, mainly including a master information block (MIB). As shown in FIG. 1, an existing common signal block includes the PSS, the SSS, and the PBCH.

After the cell search process, the terminal device has achieved downlink synchronization with the cell, and the terminal device needs to further obtain system information (SI) of the cell, so as to access the cell and operate correctly in the cell. The system information includes remaining minimum system information (RMSI) and other system information (OSI).

In a new radio unlicensed spectrum (NR-U) communications system, according to a regulatory requirement, signal transmission of a network device on an unlicensed spectrum needs to occupy at least 80% of an entire system bandwidth, and an available channel bandwidth on a 5 GHz unlicensed spectrum is at least 20 MHz. Therefore, 20 MHz may be used as a minimum available channel bandwidth for initial access.

In a low frequency range, for example, 5 GHz, the common signal block and the RMSI support a plurality of subcarrier spacings, and optionally, there are subcarrier spacings such as 15 kHz, 30 kHz, and 60 kHz. When a subcarrier spacing is relatively small, based on a structure of the current common signal block, the common signal block includes four consecutive OFDM symbols in time domain, and 20 physical resource blocks (PRB) for each symbol in frequency domain. Therefore, transmission and mapping of a single common signal block are far from meeting a requirement of 80% channel occupancy required by a regulation.

In NR, in addition to the foregoing signals for cell search, a discovery reference signal (DRS) further exists. The DRS is mainly used for inter-cell mobility measurement. The DRS may include a common signal block, a channel state information-reference signal (CSI-RS), RMSI, and CORESET of the RMSI, a paging message, OSI, and the like. The common signal block and the CSI-RS may be used as basic constituent signals, and other signals, such as the RMSI, the OSI, and the paging message, are used as optional signals of the DRS. DRS composition may be limited by various factors such as a resource preemption result of the network device in an unlicensed spectrum, subcarrier spacings of different signals, and regulatory requirements.

In a long term evolution (LTE) license assisted access (LAA) mechanism, a cell-specific reference signal, a primary synchronization signal, and a secondary synchronization signal are basic constituent signals of a DRS, and a CSI-RS is an optional constituent signal. The network device semi-statically indicates, by using radio resource control (RRC) signaling, whether the DRS composition includes the CSI-RS.

However, before signal transmission in NR-U, channel listening and discovery, for example, listen before talk (LBT), need to be performed. The network device and/or the terminal device can perform signal transmission only when the LBT succeeds. To reduce a quantity of times of channel discovery, the network device usually aggregates as many signals as possible for homeopathic and compact transmission, for example, aggregates as many signals as possible, including RMSI, OSI, and paging messages, into the DRS for transmission, so as to reduce a channel access delay.

Because an LBT result changes dynamically, if an existing LTE technology is directly used, and the network device configures, for the terminal device by using semi-static signaling, whether other optional signals are included in the DRS, indication for the DRS composition is not accurate enough, frequent channel discovery may also be caused, and resource utilization efficiency of the DRS is low.

SUMMARY

Example embodiments of this application provide a communication method and a communications apparatus, to accurately indicate composition of a DRS, so as to avoid frequent channel discovery, and improve resource utilization efficiency of the DRS.

According to a first non-limiting aspect of an example embodiment, a communication method is provided, including: receiving a discovery reference signal from a network device, where the discovery reference signal includes one or more first signals and one or more second signals; the one or more first signal include at least a common signal block or a channel state information-reference signal (CSI-RS); the one or more first signals carry configuration information of the one or more second signals; and the configuration information of the one or more second signals is used to indicate at least whether the discovery reference signal includes the one or more second signals, or indicate at least a type of the one or more second signals included in the discovery reference signal.

In this aspect, the configuration information of the one or more second signals is carried in the one or more first signals, so that composition of the DRS can be accurately indicated, to avoid frequent channel discovery, and improve resource utilization efficiency of the DRS.

According to a non-limiting second aspect of an example embodiment, a communication method is provided, including: receiving configuration information of a discovery reference signal from a network device, where the discovery reference signal includes one or more first signals, and one or more second signals; the one or more first signals include at least a common signal block or a channel state information-reference signal (CSI-RS); and the configuration information of the discovery reference signal is used to indicate at least whether the discovery reference signal includes the one or more second signals, or indicate at least a type of the one or more second signals included in the discovery reference signal; and receiving the discovery reference signal from the network device based on the configuration information of the discovery reference signal.

In this aspect, the configuration information of the discovery reference signal is received from the network device, so that composition of the DRS can be accurately indicated, to avoid frequent channel discovery, and improve resource utilization efficiency of the DRS.

With reference to the second aspect, in an example implementation, the receiving configuration information of the discovery reference signal includes: receiving downlink control information from the network device, where the downlink control information carries the configuration information of the discovery reference signal.

In this implementation, the configuration information of the discovery reference signal is carried in the downlink control information, so that a configuration of the discovery reference signal can be clearly indicated.

With reference to the example implementation of the second aspect, in another example implementation, the receiving downlink control information from the network device includes: receiving the downlink control information through a common control channel of the one or more second signals.

In this implementation, the downlink control information that carries the configuration information of the discovery reference signal is sent through the common control channel, and the channel may be a control channel scrambled by using a DRS-RNTI.

According to a non-limiting third aspect of an example embodiment, a communication method is provided, including: sending a discovery reference signal to a terminal device, where the discovery reference signal includes one or more first signals, and the discovery reference signal further includes one or more second signals; the one or more first signals include at least a common signal block or a channel state information-reference signal (CSI-RS); the one or more first signals carry configuration information of the one or more second signals; and the configuration information is used to indicate at least whether the discovery reference signal includes the second signal, or the configuration information of the one or more second signals is used to indicate at least a type of the one or more second signals included in the discovery reference signal.

According to a non-limiting fourth aspect of an example embodiment, a communication method is provided, including: sending configuration information of a discovery reference signal to a terminal device, where the discovery reference signal includes one or more first signals, and one or more second signals; the one or more first signals include at least a common signal block or a channel state information-reference signal (CSI-RS); and the configuration information of the discovery reference signal is used to indicate at least whether the discovery reference signal includes the one or more second signals, or indicate at least a type of the one or more second signals included in the discovery reference signal; and sending the discovery reference signal to the terminal device based on the configuration information of the discovery reference signal.

With reference to the fourth aspect, in an example implementation, the sending configuration information of a discovery reference signal to a terminal device includes: sending downlink control information to the terminal device, where the downlink control information carries the configuration information of the discovery reference signal.

With reference to the example implementation of the fourth aspect, in another example implementation, the sending downlink control information to the terminal device includes: sending the downlink control information to the terminal device through a common control channel of the one or more second signals.

With reference to any one of the first aspect to the fourth aspect or the example implementations thereof, in still another example implementation, the one or more second signals include one or more of: remaining minimum system information (RMSI), other system information (OSI), a paging message, or a random access response.

With reference to any one of the first aspect to the fourth aspect or the example implementations thereof, in still another example implementation, the one or more second signals further include one or more of a control channel of the remaining minimum system information (RMSI), a control channel of the other system information (OSI), a control channel of the paging message, or a control channel of the random access response.

With reference to any one of the first aspect or the third aspect or the example implementations thereof, in still another example implementation, that the one or more first signals carry the configuration information of the second signal includes: a sequence initialization value or a sequence cyclic shift value of the CSI-RS carries the configuration information.

In this implementation, the sequence initialization value or the sequence cyclic shift value of the CSI-RS may be used to carry the configuration information of the one or more second signals, so that overheads of the configuration information can be reduced.

With reference to any one of the first aspect or the third aspect or the example implementations thereof, in still another example implementation, the common signal block includes a demodulation reference signal of a physical broadcast channel; and that the one or more first signals carry the configuration information of the one or more second signals includes: a sequence initialization value or a sequence cyclic shift value of the demodulation reference signal of the physical broadcast channel carries the configuration information.

In this implementation, the sequence initialization value or the sequence cyclic shift value of the demodulation reference signal of the physical broadcast channel is used to carry the configuration information of the one or more second signals, so that overheads of the configuration information can be reduced.

With reference to any one of the first aspect or the third aspect or the example implementations thereof, in still another example implementation, the common signal block includes a physical broadcast channel; and that the one or more first signals carry the configuration information of the one or more second signals includes: a payload of the physical broadcast channel carries the configuration information of the one or more second signals.

In this implementation, the payload of the physical broadcast channel is used to carry the clear configuration information of the one or more second signals, so that overheads of the configuration information can be reduced.

With reference to any one of the first aspect or the third aspect or the example implementations thereof, in still another example implementation, the common signal block includes a physical broadcast channel; and that the one or more first signals include configuration information of the one or more second signals includes: A payload of the physical broadcast channel carries a mapping pattern of the one or more first signals and the one or more second signals, where the mapping pattern includes types and time-frequency resources of the one or more first signals and the one or more second signals.

In this implementation, the payload of the physical broadcast channel may alternatively be used to carry the mapping pattern of the one or more first signals and the one or more second signals, so that the configuration information of the one or more second signals can be obtained.

With reference to any one of the first aspect or the third aspect or the example implementations thereof, in still another example implementation, the one or more first signals further include RMSI; the one or more second signals include at least one of other system information (OSI), a paging message, or a random access response; and that the one or more first signals carry the configuration information of the one or more second signals is: the RMSI carries the configuration information of the one or more second signals.

In this implementation, when the one or more first signals include the RMSI, the RMSI may carry scheduling information of the OSI. When a constituent signal of the DRS includes the RMSI, because the OSI in the DRS is scheduling OSI transferred from a previous LBT failure, some scheduling indication fields of the OSI in the RMSI in the DRS may be invalid, so that the network device may use these fields to indicate whether the OSI, the paging message, and the random access response exist, thereby improving resource utilization and reducing overheads of the configuration information.

With reference to any one of the first aspect to the fourth aspect or the example implementations thereof, in still another example implementation, the one or more second signals include the OSI, the OSI included in the one or more second signals is determined according to a predetermined rule, and the predetermined rule defines that a priority of on-demand OSI of the terminal device is higher than that of non-on-demand OSI.

In this implementation, when the OSI is transferred to the DRS, the OSI is transferred based on a priority of the OSI, to ensure that OSI with a higher priority is sent first.

With reference to any one of the first aspect to the fourth aspect or the example implementations thereof, in still another example implementation, the one or more second signals includes a paging message, the paging message included in the one or more second signals is determined according to a predetermined rule, and the predetermined rule defines that a priority of a short paging message is higher than that of a normally scheduled paging message.

In this implementation, when the paging message is transferred to the DRS, the paging message is transferred based on a priority of the paging message, to ensure that a paging message with a higher priority is first sent.

According to a non-limiting fifth aspect of an example embodiment, a communications apparatus is provided, to implement the communication method in any one of the example implementations of the first aspect or the second aspect. For example, the communications apparatus may be a chip (for example, a communications chip) or a terminal device. The foregoing method may be implemented by software or hardware, or by executing corresponding software by hardware.

In an example implementation, a structure of the communications apparatus includes a processor and a memory, and the processor is configured to support the apparatus in performing a corresponding function in the foregoing communication method. The memory is configured to be coupled to the processor, and stores a program (instructions) and/or data necessary for the apparatus. Optionally, the communications apparatus may further include a communications interface, configured to support communication between the apparatus and another network element.

In another example implementation, the communications apparatus may include units and modules that perform corresponding actions in the foregoing method.

In still another example implementation, a processor and a transceiver apparatus are included, where the processor is coupled to the transceiver apparatus, and the processor is configured to execute a computer program or instructions, to control the transceiver apparatus to receive and send information; and when the processor executes the computer program or the instructions, the processor is further configured to implement the foregoing method. The transceiver apparatus may be a transceiver, a transceiver circuit, or an input/output interface. When the communications apparatus is a chip, the transceiver apparatus is a transceiver circuit or an input/output interface.

In still another example implementation, a structure of the communications apparatus includes a processor, and the processor is configured to support the apparatus in performing a corresponding function in the foregoing communication method.

In still another example implementation, a structure of the communications apparatus includes a processor, and the processor is configured to be coupled to a memory, read an instruction in the memory, and implement the foregoing method based on the instruction.

In still another example implementation, a structure of the communications apparatus includes a transceiver, configured to implement the foregoing communication method.

When the communications apparatus is a chip, the transceiver may be an input/output unit, for example, an input/output circuit or a communications interface. When the communications apparatus is user equipment, the transceiver may be a transmitter/receiver or a transmitter/receiver machine.

According to a non-limiting sixth aspect of an example embodiment, a communications apparatus is provided, to implement the communication method in either of or any example implementation of the third aspect or the fourth aspect. For example, the communications apparatus may be a chip (for example, a baseband chip or a communications chip) or a network device, and the foregoing method may be implemented by software or hardware, or by executing corresponding software by hardware.

In an example implementation, a structure of the communications apparatus includes a processor and a memory, where the processor is configured to support the apparatus in performing a corresponding function in the foregoing communication method. The memory is configured to be coupled to the processor, and stores a program (instructions) and data necessary for the apparatus. Optionally, the communications apparatus may further include a communications interface, configured to support communication between the apparatus and another network element.

In another example implementation, the communications apparatus may include units and modules that perform corresponding actions in the foregoing method.

In still another example implementation, a processor and a transceiver apparatus are included, where the processor is coupled to the transceiver apparatus, and the processor is configured to execute a computer program or instructions, to control the transceiver apparatus to receive and send information; and when the processor executes the computer program or the instructions, the processor is further configured to implement the foregoing method. The transceiver apparatus may be a transceiver, a transceiver circuit, or an input/output interface. When the communications apparatus is a chip, the transceiver apparatus is a transceiver circuit or an input/output interface.

In still another example implementation, a structure of the communications apparatus includes a processor, and the processor is configured to support the apparatus in performing corresponding functions in the foregoing communication method.

In still another example implementation, a structure of the communications apparatus includes a processor, and the processor is configured to be coupled to a memory, read instructions in the memory, and implement the foregoing method based on the instructions.

In still another example implementation, a structure of the communications apparatus includes a transceiver, configured to implement the foregoing communication methods.

When the communications apparatus is a chip, the transceiver may be an input/output unit, for example, an input/output circuit or a communications interface. When the communications apparatus is a network device, the transceiver may be a transmitter/receiver (also referred to as a transmitter/receiver machine).

According to a non-limiting seventh aspect of an example embodiment, a computer readable storage medium is provided, where the computer readable storage medium stores a computer program or instructions, and when the computer program or the instructions is executed, the methods in the foregoing aspects are implemented.

According to a non-limiting eighth aspect of an example embodiment, a computer program product including one or more instructions is provided. When the one or more instructions are run on a computer, the computer is enabled to perform the methods in the foregoing aspects.

According to a non-limiting ninth aspect of an example embodiment, a communications system is provided, including the foregoing communications apparatus.

DESCRIPTION OF EMBODIMENTS

The following describes the embodiments of the present invention with reference to the accompanying drawings in the present disclosure.

Figure 1:
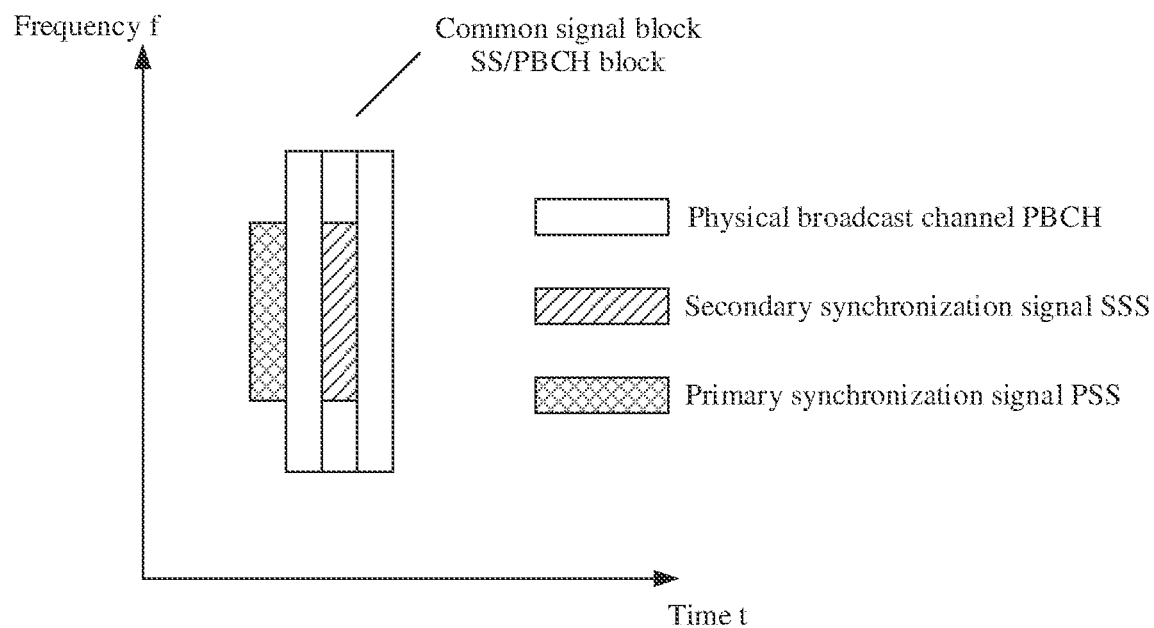
FIG. 1 is a schematic structural diagram of a common signal block.
Figure 2:
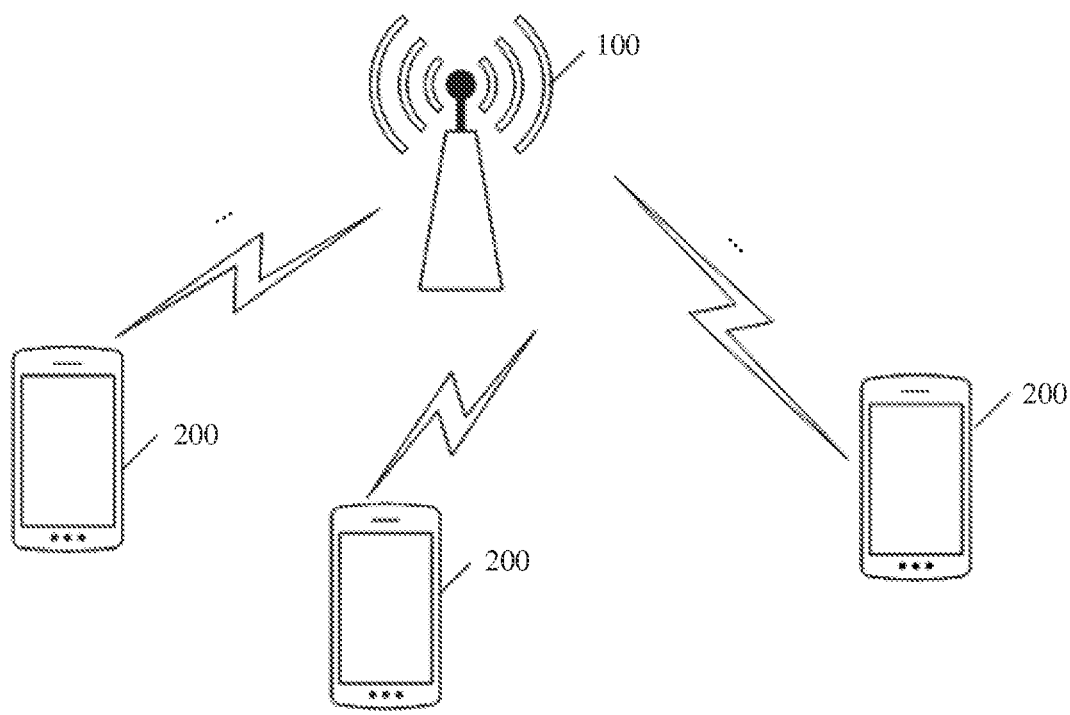
FIG. 2 is a schematic diagram of a communications system according to an embodiment of this application.

FIG. 2 is a schematic diagram of a communications system according to an embodiment of this application. The communications system may include at least one network device 100 (only one is shown) and one or more terminal devices 200 connected to the network device 100.

The network device 100 may be a device that can communicate with the terminal device 200. The network device 100 may be any device having a wireless transceiver function, including but not limited to a NodeB, an evolved NodeB (eNodeB), a base station in a 5th generation (5G) communications system, a base station or a network device in a future communications system, an access node in a Wi-Fi system, a wireless relay node, a wireless backhaul node, and the like. Alternatively, the network device 100 may be a radio controller in a cloud radio access network (CRAN) scenario. Alternatively, the network device 100 may be a small cell, a transmission reference node (TRP), or the like. A specific technology and a specific device form used by the network device are not limited in the embodiments of this application.

The terminal device 200 is a device having a wireless transceiver function, and may be deployed on land, including an indoor or outdoor, handheld, wearable, or in-vehicle device; may be deployed on water, for example, on a ship; or may be deployed in the air, such as on an airplane, a balloon, or a satellite. The terminal device 200 may be a mobile phone, a tablet computer (Pad), a computer with a wireless transceiver function, a virtual reality (VR) terminal device, or an augmented reality (AR) terminal device, a wireless terminal in industrial control, a wireless terminal in self-driving, a wireless terminal in remote medical care, a wireless terminal in a smart grid, a wireless terminal in transportation safety, a wireless terminal in a smart city, a wireless terminal in a smart home, or the like. An application scenario is not limited in the embodiments of this application. The terminal device 200 sometimes may also be referred to as user equipment (UE), an access terminal device, a UE unit, a mobile station, a mobile console, a remote station, a remote terminal device, a mobile device, a terminal, a wireless communications device, a UE agent, a UE apparatus, or the like.

It should be noted that the terms "system" and "network" may be used interchangeably in the embodiments of the present disclosure. "A plurality of" means two or more. In view of this, "a plurality of" may also be understood as "at least two" in the embodiments of the present disclosure. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between objects.

Figure 3:
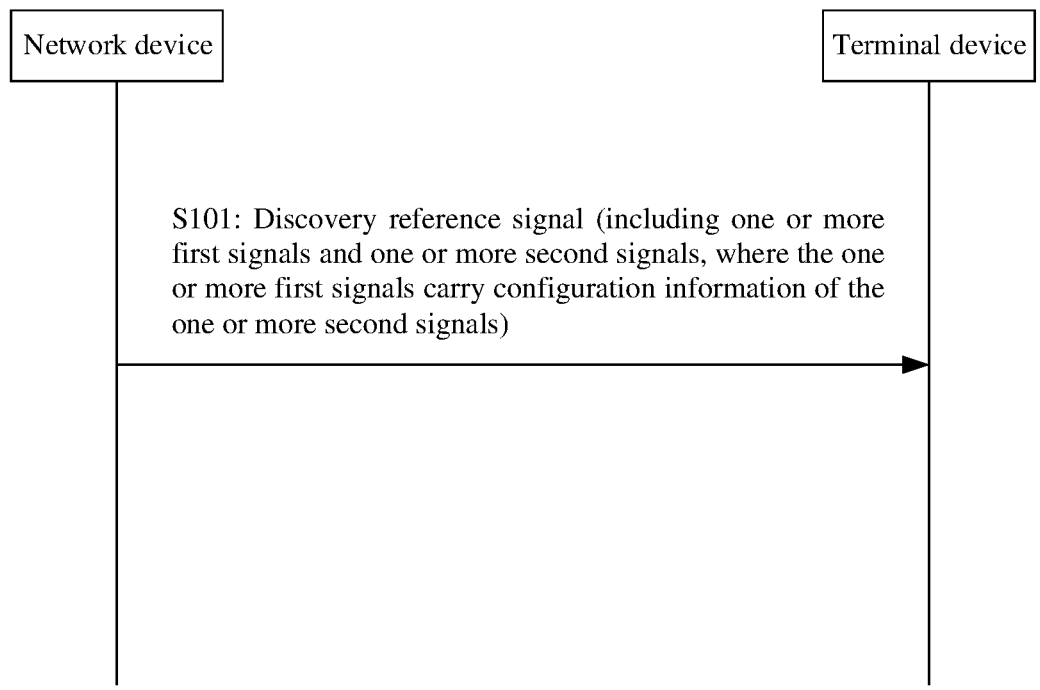
FIG. 3 is a schematic interaction flowchart of a communication method according to an embodiment of this application.

FIG. 3 is a schematic interaction flowchart of a communication method according to an embodiment of this application.

S101: A network device sends a discovery reference signal to a terminal device, where the discovery reference signal includes one or more first signals, and one or more second signals; and the one or more first signals include at least a common signal block or a channel state information-reference signal (CSI-RS). Whether the discovery reference signal includes the one or more second signals is configurable.

The one or more first signals carry configuration information of the one or more second signals, and the configuration information is used to indicate at least whether the discovery reference signal includes the one or more second signals, or the configuration information is used to indicate at least a type of the one or more second signals included in the discovery reference signal.

Correspondingly, the terminal device receives the discovery reference signal.

The DRS includes one or more first signals, and the one or more first signals include at least the common signal block or the CSI-RS. To be specific, the one or more first signals may include only the common signal block, or the one or more first signals include only the CSI-RS, or the one or more first signals include the common signal block and the CSI-RS. The one or more first signals are a basic constituent signal of the DRS. However, in some scenarios, for example, in a scenario of a low frequency band range and a small subcarrier spacing, transmission bandwidth of a common signal block and/or a CSI-RS is relatively small, and it is difficult for the common signal block and/or the CSI-RS in a specific time unit to meet an 80% spectrum occupation requirement required by a regulation. To meet the requirement of this regulation, the network device may perform frequency division multiplexing on these signals, including: performing frequency division multiplexing on a plurality of first signals, or performing frequency division multiplexing on the first signal(s) and the second signal(s), or performing frequency division multiplexing on a plurality of second signals. That is, at least one signal commonly occupies bandwidth in a specific time unit in a frequency division manner. This is not specifically limited in embodiments of the present disclosure. In other words, the DRS may further include one or more second signals. In addition, before signal transmission in NR-U, channel listening and discovery, for example, LBT, need to be performed first. The network device or the terminal device can perform signal transmission only when the LBT succeeds. To reduce a quantity of times of channel discovery, the network device usually aggregates as many signals as possible for fast transmission, for example, aggregates as many second signals as possible in a time period of the DRS for transmission, so as to reduce a channel access delay. Because an LBT result changes dynamically, when the second signal included in the DRS is related to the LBT result, indication for the second signal included in the DRS also needs to be timely and accurate.

In this embodiment, the one or more first signals carry the configuration information of the one or more second signals. The configuration information is used to indicate at least whether the DRS includes the one or more second signals, or when the DRS includes the one or more second signals, the configuration information is used to indicate at least a type of the one or more second signals included in the discovery reference signal. For example, the configuration information is used to indicate at least one of information such as, a specific second signal included in the discovery reference signal, and a quantity of second signals included in the discovery reference signal. The one or more second signals include one or more of: a CSI-RS, RMSI, OSI, a paging message, or a random access response (RAR). The one or more second signals may further include one or more of: a control channel of the RMSI, a control channel of the OSI, a control channel of the paging message, or a control channel of the RAR. The RMSI, the OSI, the paging message, and the random access response are transmitted on a physical downlink shared channel, and time-frequency resource allocation of the physical downlink shared channel is scheduled by a physical downlink control channel. Therefore, when any one or more of the RMSI, the OSI, the paging message, and the random access response are included in the DRS, a corresponding control channel is also included in the DRS. The one or more first signals are used to carry the configuration information of the one or more second signal, so that an indication for signal composition of the DRS can be implemented in a timely and accurate manner, and an objective of reducing configuration overheads can be achieved.

Specifically, in an implementation, the network device uses the constituent signal CSI-RS in the DRS to carry the configuration information of the one or more second signals. Specifically, that the one or more first signals carry the configuration information of the one or more second signals includes: a sequence initialization value or a sequence cyclic shift value of the CSI-RS carries the configuration information. For example, during CSI-RS transmission, an initialization value or a cyclic shift value of a CSI-RS sequence is determined, and the configuration information of the one or more second signals is used as a parameter for determining the initialization value of the CSI-RS sequence or a parameter for determining the cyclic shift value of the CSI-RS sequence. In this way, when receiving the DRS and obtaining a CSI-RS, the terminal device may obtain the configuration information of the one or more second signals based on the initialization value or the cyclic shift value of the CSI-RS sequence.

That the one or more second signals possibly included in the DRS are OSI and a paging message is used as an example, and configuration of the one or more second signals may be indicated by using the following state values of the configuration information of the one or more second signals:

00: null, which means that the DRS does not include the OSI or the paging message.
01: Only the OSI is included (OSI only).
10: Only the paging message is included (paging only).
11: Both the OSI and the paging message are included.

In other words, the initialization value or the cyclic shift value of the CSI-RS sequence is determined based on the state value of the configuration information of the one or more second signals.

Certainly, the foregoing is merely an example. The DRS may further include another second signal, for example, an RAR and RMSI. A configuration principle of the second signal herein is the same as that described above, and details are not repeated herein.

The network device schedules, in the DRS, the carried one or more second signals based on the configuration information of the one or more second signals carried in the CSI-RS, that is, based on which second signals are carried in the DRS. Optionally, scheduling of the RMSI, the OSI, the paging message, and the RAR may be jointly indicated by one control channel, or may be separately configured by four control channels. This is not specifically limited in embodiments of the present disclosure. "Jointly indicated by one control channel" means that one DCI format includes scheduling information of the RMSI, the OSI, the paging message, and the RAR, and time-frequency resource allocations of at least two of the four signals are associated with each other, for example, a frequency-domain resource size of the RAR is equal to a specifically predefined system bandwidth minus frequency-domain resource sizes of the OSI and the paging message. Alternatively, time-domain resources of at least two of the four signals are associated with each other, for example, a time-domain resource of one paging message is the same as a time-domain resource of another paging message.

In another implementation, similar to carrying the configuration information of the one or more second signals by using the CSI-RS, the network device may alternatively use a demodulation reference signal of a physical broadcast channel in the common signal block, which is a constituent part of the DRS, to carry the configuration information of the one or more second signals. Specifically, that the one or more first signals carry the configuration information of the one or more second signals includes: a sequence initialization value or a sequence cyclic shift value of the demodulation reference signal of the physical broadcast channel carries the configuration information. A manner in which the sequence initialization value or the sequence cyclic shift value of the demodulation reference signal of the physical broadcast channel carries the configuration information of the one or more second signals is similar to the manner in which the sequence initialization value or the sequence cyclic shift value of the CSI carries the configuration information of the one or more second signals. Details are not repeated herein.

In still another implementation, the network device may alternatively carry the configuration information of the one or more second signals by using a payload of the physical broadcast channel. The payload means valid information bits of the physical broadcast channel before coding. Optionally, these valid information bits may be information bits in a MIB. It should be understood that the valid information bits may be information bits of a MIB carried in a physical layer and/or a higher layer. Specifically, two implementations are included for the payload of the physical broadcast channel to carry the configuration information of the second signal:

(1) The configuration information of the second signal is directly indicated in the physical broadcast channel. Specifically, that the first signal carries the configuration information of the second signal includes: the payload of the physical broadcast channel carries the configuration information of the second signal. For example, the payload of the physical broadcast channel contains bits used to represent the configuration information of the second signal.

(2) The payload of the physical broadcast channel carries a mapping pattern of the first signal and the second signal. The mapping pattern is used to at least indicate types and/or time-frequency resources of the first signal and the second signal (for example, a multiplexing manner of the time-frequency resources, a time-frequency resource unit occupied by each signal, a relative position relationship, and the like).

Specifically, the network device and the terminal device side have a plurality of predefined mapping patterns of the first signal and the second signal, and information about each mapping pattern includes not only the types of the first signal and the second signal, but also information about the time-frequency resources of the first signal and the second signal. In a DRS mapping pattern diagram shown in FIG. 4, the following three patterns are defined:

Pattern 1: Common signal block, CSI-RS, and RMSI;
Pattern 2: Common signal block, CSI-RS, RMSI, and paging message; and
Pattern 3: Common signal block, CSI-RS, RMSI, paging message, and OSI.

Figure 4:
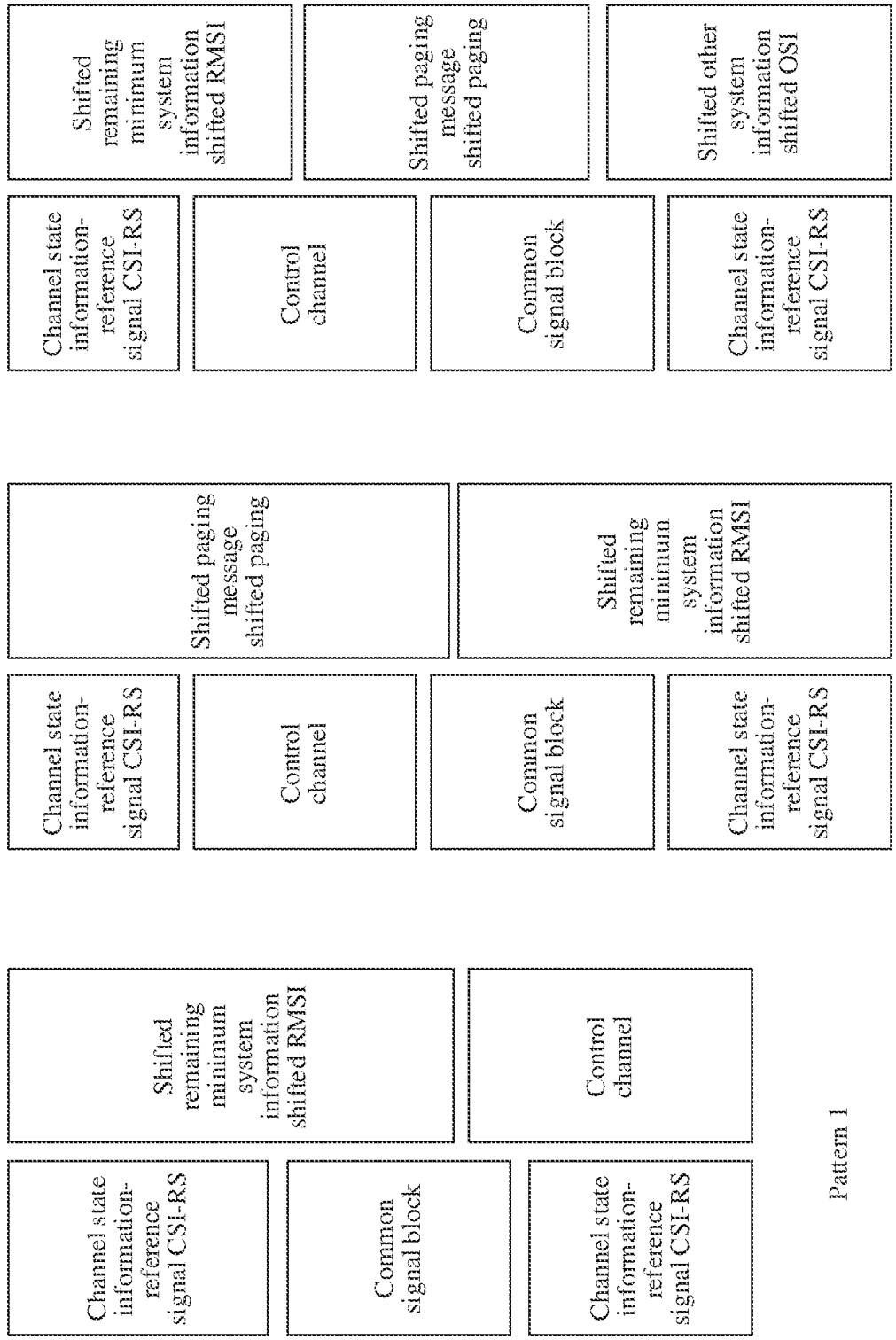
FIG. 4 is a non-limiting example schematic diagram of mapping patterns in a discovery reference signal.
Figure 5:
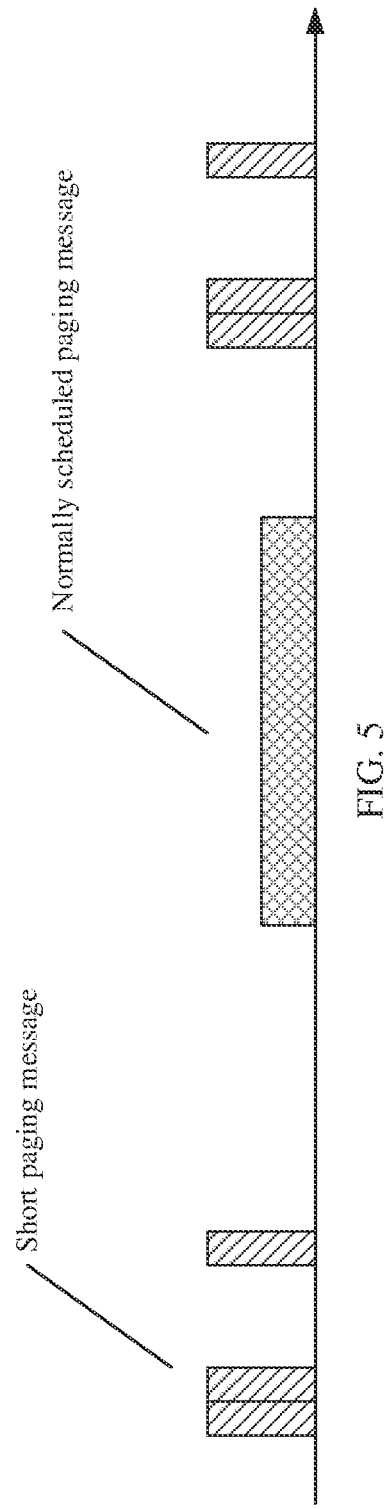
FIG. 5 is a non-limiting example schematic diagram of a short paging message and a normally scheduled paging message.

In the pattern 1, constituent signals of the DRS include a common signal block, CSI-RSs, and RMSI, which are multiplexed in a manner shown in FIG. 4. Herein, the common signal block and the CSI-RSs are multiplexed in frequency division, the RMSI and a control channel resource (CORESET) corresponding to the RMSI are multiplexed in frequency division, and the common signal block and an RMSI CORESET are multiplexed in time division.

In the pattern 2, constituent signals of the DRS include a common signal block, CSI-RSs, RMSI, and a paging message, which are multiplexed in the manner shown in FIG. 4. Herein, the common signal block, the CSI-RSs, and an RMSI CORESET are multiplexed in frequency division, the RMSI and the paging message are multiplexed in frequency division, and the common signal block and the RMSI are multiplexed in time division.

In the pattern 3, constituent signals of the DRS include a common signal block, CSI-RSs, RMSI, OSI, and a paging message, which are multiplexed in the manner shown in FIG. 4. Herein, the common signal block, the CSI-RSs, and an RMSI CORESET are multiplexed in frequency division, the RMSI, the OSI, and the paging message are multiplexed in frequency division, and the common signal block and the RMSI are multiplexed in time division.

It may be understood that, herein, a type of a signal possibly included in the DRS may alternatively be another signal different from the RMSI, the OSI, and the paging message, for example, an RAR. This is not specifically limited in embodiments of the present disclosure.

Alternatively, the mapping pattern of the constituent signals of the DRS may be a time-frequency resource mapping pattern of at least any two signals of the CSI-RS, the RMSI, the OSI, the paging message, or the RAR, that is, may be another pattern different from the foregoing three patterns, and this is not specifically limited in embodiments of the present disclosure.

Index information of any of the foregoing mapping patterns may be indicated by using bits. The payload of the physical broadcast channel may be used to carry the index information of any of the foregoing mapping patterns, and the terminal device may learn, based on the index information of the mapping pattern, which mapping pattern is used by the network device, to learn which signals are included in the DRS, for example, which signals are included in the first signal and which signals are included in the second signal.

Optionally, another signal, such as a PBCH DMRS, may alternatively be used to carry indication information of any of the foregoing mapping patterns, or the sequence initialization value or the sequence cyclic shift value of the CSI-RS is used to carry the index information of the pattern. This is not limited in embodiments of the present disclosure.

In still another implementation of FIG. 3, the first signal includes the RMSI, and the second signal includes one or more of: the OSI, the paging message, or the RAR. That the first signal carries the configuration information of the second signal is: the RMSI carries the configuration information of the second signal.

For example, the RMSI includes scheduling information of the OSI. Specifically, the scheduling information of the OSI includes information such as a scheduled OSI type and a scheduled OSI detection window period. When a basic constituent signal of the DRS includes the RMSI and the OSI in the DRS is OSI transferred from a previous LBT failure, scheduling indication fields of the OSI in the RMSI in the DRS may be invalid or useless, so that the network device may use a field to indicate whether the second signal exists. For example, the network device may use an invalid or useless field si-SchedulingInfo in the RMSI to indicate whether the OSI and the paging message are constituent signals of the DRS. Specifically, the OSI and the paging message are used as an example, and any two bits in si-SchedulingInfo in the RMSI may be used to implement information indication for the second signal included in the DRS. Optionally, four state values corresponding to the two bits are as follows:

00: null, which means that the DRS does not include the OSI or the paging message.
01: Only the OSI is included (OSI only).
10: Only the paging message is included (paging only).
11: Both the OSI and the paging message are included.

In addition, in this embodiment, the constituent signals of the DRS may include the RMSI, the OSI, the paging message, and the RAR. In this case, a corresponding quantity of bits of the indication information for the second signal is 3. Alternatively, the constituent signals of the DRS may include the RMSI, the OSI, the paging message, and the RAR, and in this case, a corresponding quantity of bits of the indication information for the second signal is 4.

The RMSI, the OSI, the paging message, and the RAR may be RMSI, OSI, a paging message, and an RAR that are dedicated in a DRS area, or may be RMSI, OSI, a paging message, and an RAR outside the DRS area. This is not specifically limited in embodiments of the present disclosure. Because an LBT failure occurs, that is, a base station does not preempt a resource at a transmission moment of the RMSI, the OSI, the paging message, and the RAR, they are transferred to the DRS for transmission. There may be a plurality of types of OSI and paging messages. Considering that time-frequency resources that can be occupied by the DRS are limited, usually, only one type of OSI and/or paging message can be transferred to the DRS for transmission in one DRS transmission. A priority of the OSI and/or the paging message for DRS transmission may be defined, that is, a transmission type priority of the OSI and/or the paging message transferred for transmission may be defined. An optional priority order may be as follows:

A priority of on-demand OSI for the terminal device is higher than a priority of conventional non-on-demand OSI.

On-demand OSI of the terminal device may be any one of SIB2 to SIB13. Further, for a plurality of on-demand OSI of the terminal device, a priority order is: SIB2>SIB3> . . . >SIB13.

The paging message may be either of a short paging message and a normally scheduled paging message. Further, for the two paging messages, a priority of the short paging message is higher than that of the normally scheduled paging message.

When the second signal includes the OSI, the OSI included in the second signal is determined according to a predetermined rule, and the predetermined rule complies with that a priority of on-demand OSI of the terminal device is higher than that of non-on-demand OSI.

When the second signal includes the paging message, the paging message included in the second signal is determined according to a predetermined rule, and the predetermined rule complies with that a priority of a short paging message is higher than that of a normally scheduled paging message.

The foregoing embodiments may have a plurality of different variations or improvements. For example, a second signal A (a signal as a part included in the DRS) in the DRS is indicated by using a first signal A in the one or more first signals, and a second signal B (a signal as another part included in the DRS) is indicated to the terminal device by using a first signal B in the one or more first signals. The first signal A is, for example, a PBCH DMRS. The first signal B is, for example, a PBCH.

According to the communication method provided in this embodiment of this application, the first signal in the discovery reference signal is used to carry the configuration information of the second signal, so that composition of the discovery reference signal can be indicated more accurately in a timelier manner, to avoid frequent channel discovery, and improve resource utilization efficiency of the discovery reference signal.

Figure 6:
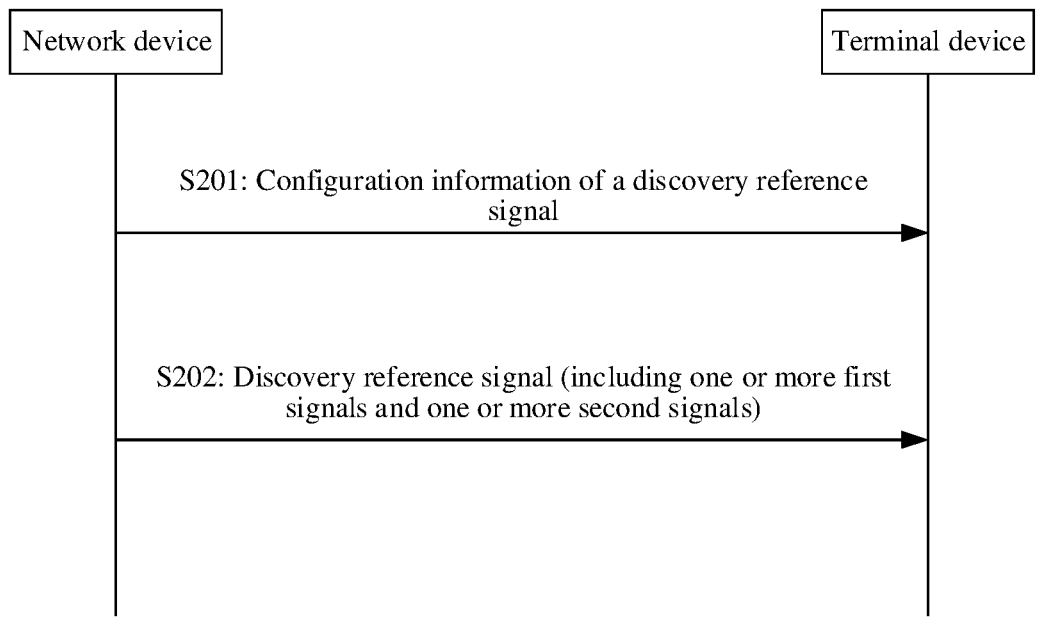
FIG. 6 is a schematic interaction flowchart of another communication method according to an embodiment of this application.

FIG. 6 is a schematic interaction flowchart of a communication method according to an embodiment of this application.

S201: A network device sends configuration information of a discovery reference signal to a terminal device, where the discovery reference signal includes one or more first signals, and the discovery reference signal further includes one or more second signals; the one or more first signals include at least a common signal block or a channel state information-reference signal (CSI-RS); and the configuration information is used to indicate at least whether the discovery reference signal includes the one or more second signals, or the configuration information is used to indicate at least a type of the one or more second signals included in the discovery reference signal.

Correspondingly, the terminal device receives the configuration information of the discovery reference signal.

In this embodiment, before sending the DRS, the network device sends the configuration information of the DRS to the terminal device. The configuration information is used to indicate at least whether the DRS includes the one or more second signals, or when the DRS includes the one or more second signals, the configuration information is used to indicate at least the type of the one or more second signals included in the discovery reference signal. The one or more second signals include one or more of: RMSI, OSI, a paging message, or an RAR. The one or more second signals may further include one or more of: a control channel of the RMSI, a control channel of the OSI, a control channel of the paging message, or a control channel of the RAR.

S202: The network device sends the discovery reference signal to the terminal device based on the configuration information of the discovery reference signal.

Correspondingly, the terminal device receives the discovery reference signal.

After receiving the configuration information of the DRS, the terminal device may receive the DRS based on the configuration information of the DRS. To be specific, the terminal device may learn, based on the configuration information of the DRS, the one or more first signals and the one or more second signals that are included in the DRS sent by the network device, so as to obtain the one or more first signals and the one or more second signals in the DRS.

Specifically, in an implementation, S201 includes: receiving downlink control information (DCI) from the network device, where the downlink control information carries the configuration information of the discovery reference signal.

The network device uses the downlink control information to carry the configuration information of the discovery reference signal. Specifically, a specific common control channel of the one or more second signals may be used to carry the DCI. Optionally, for example, a configuration of the DRS is represented by using a bitmap. That the one or more second signals are at least one of the RMSI, the OSI, or the paging message is used as an example. Three bits may be used to implement information indication for the one or more second signals included in the DRS. Optionally, eight state values corresponding to the three bits are as follows:

000: null, which means that the RMSI, the OSI, or the paging message is not included.
001: Only the paging message is included.
010: Only the OSI is included.
100: Only the RMSI is included.
110: Both the RMSI and the OSI are included.
101: Both the RMSI and the paging message are included.
011: Both the OSI and the paging message are included.
111: The RMSI, the OSI, and the paging message are all included.

The specific common control channel is a common control channel of the paging message, the OSI, the RMSI, the RAR, and the like. Optionally, the specific common control channel may be a new control channel different from an existing control channel in NR Rel-15. For example, the channel is a control channel scrambled by using a DRS-RNTI.

Scheduling (namely, time-frequency resource allocation) of the one or more second signals in the DRS is further performed based on the DCI (configuration information of the DRS) carried on the common control channel Scheduling of the one or more second signals in the DRS may be jointly indicated by one piece of DCI, that is, one piece of DCI includes scheduling information of a plurality of second signals, and scheduling information of a specific signal may be obtained explicitly or implicitly based on scheduling information of another signal or a plurality of other signals. Alternatively, scheduling of the second signals in the DRS may be independently indicated by a plurality of pieces of DCI, respectively. This is not specifically limited in embodiments of the present disclosure.

A person skilled in the art may know that the foregoing embodiments may have a plurality of variations or improvements. For example, optionally, the foregoing configuration information is sent by the network device to the terminal device by using RRC signaling, and may be indicated together with other information such as a DRS period and a time offset, or may be separately indicated. This is not limited in embodiments of the present disclosure.

Specifically, the foregoing configuration information (also referred to as composition information) may be notified by the network device to the terminal device by using the RRC signaling and the one or more first signals. For example, first composition information of the DRS is indicated by using the RRC signaling, and second composition information of the DRS is further carried by using the one or more first signals. The second composition information is indicated based on the first composition information. For example, the RRC signaling carries a constituent signal set included in the DRS, and the first signal further indicates which signals in the constituent signal set are actually included in the DRS.

A person skilled in the art may understand that the foregoing embodiments (for example, the solutions shown in FIG. 3 and FIG. 6) may be combined. For example, in an implementation, the network device sends RRC signaling, where the RRC signaling carries first composition information used to indicate composition of the DRS; and sends the DRS including a first signal and a second signal, where the first signal in the DRS carries second composition information used to indicate composition of the DRS. Specifically, the first composition information and the second composition information of the DRS may be the same or different. For example, in the first composition information indicated by the RRC signaling, the DRS includes a CSI-RS, RMSI, and OSI, and in the second composition information indicated by the first signal, the DRS includes the CSI-RS, the RMSI, and the paging message. When receiving two different types of indication information for DRS composition, the terminal device overwrites, by default with the indication information carried in the first signal, the indication information notified by using the RRC signaling, and obtains the second signal in the DRS based on the indication information carried in the first signal; or if only one type of composition information is received, obtains the second signal in the DRS based on the received composition information.

In addition to the foregoing various implicit or explicit DRS indication configuration information (composition information), there is another indication method. For example, in an implementation, indication for DRS composition information is implicitly determined, for example, a standard followed by a network device side and a terminal device side has a plurality of predefined DRS composition patterns at different subcarrier spacings. When a subcarrier spacing is given, corresponding DRS composition information is also determined. The network device side and the terminal device may prestore the information. An example DRS sending and receiving process includes: The network device sends a DRS by using a first subcarrier spacing, where a signal included in the DRS complies with a predefined DRS composition pattern corresponding to the first subcarrier spacing; and receiving, by the terminal device, the DRS, and specifically receiving the DRS (a reference signal in the DRS is obtained by parsing) based on the DRS composition pattern corresponding to the first subcarrier spacing used by the DRS. The DRS composition pattern may be the same as that in the foregoing embodiments, or may be in another manner. In addition, the terminal already obtains a subcarrier spacing value in an initial access phase or when previously receiving another signal.

In an implementation, indication for DRS composition information is determined explicitly and implicitly, for example, an optional DRS composition pattern is first determined implicitly based on the subcarrier spacing (refer to the foregoing implementations), and then DRS composition information is explicitly indicated by using the RRC signaling or the first signal (refer to the foregoing implementations). The implementations mentioned in this specification may be combined without technical conflicts.

For example, in an implementation, the first signal (a signal as a part included in the DRS) in the DRS is indicated by using the RRC signaling, and the second signal (a signal as another part included in the DRS) is indicated to the terminal device by using the first signal. For example, composition information of the CSI-RS and the RMSI in the DRS is indicated to the terminal device by the RRC signaling, and composition information of the OSI and the paging message in the DRS is indicated to the terminal device by using the CSI-RS or the RMSI in the DRS.

Alternatively, the network device may indicate the DRS composition information only by using the RRC signaling or the first signal. This is not specifically limited in the solutions of the present invention.

According to the foregoing communication methods provided in the embodiments of this application, the configuration information of the discovery reference signal from the network device is implicitly or explicitly received, so that composition of the discovery reference signal can be indicated more accurately in a timelier manner, to avoid frequent channel discovery, and improve resource utilization efficiency of the discovery reference signal. Compared with the explicit method, the implicit indication manner may further reduce overheads.

The methods in the embodiments of the present invention are described above in detail. The following provides apparatuses in the embodiments of the present invention.

Figure 7:
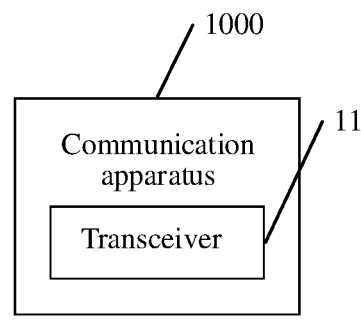
FIG. 7 is a schematic structural diagram of a communications apparatus according to an embodiment of this application.

Based on a same concept of the communication method in the foregoing embodiments, as shown in FIG. 7, an embodiment of this application further provides a communications apparatus 1000. The communications apparatus 1000 may be applied to the communication method shown in FIG. 3. The communications apparatus 1000 may be the terminal device 200 shown in FIG. 2, or may be a component (for example, a chip) applied to the terminal device 200. The communications apparatus 1000 includes a transceiver 11.

The transceiver 11 is configured to receive a discovery reference signal from a network device, where the discovery reference signal includes one or more first signals, and the discovery reference signal further includes one or more second signals; and the one or more first signals include at least a common signal block or a channel state information-reference signal (CSI-RS). Whether the discovery reference signal includes the one or more second signals is configurable.

The one or more first signals carry configuration information of the one or more second signals, and the configuration information is used to indicate at least whether the discovery reference signal includes the one or more second signals, or the configuration information of the one or more second signals is used to indicate at least a type of the one or more second signals included in the discovery reference signal.

For more detailed descriptions of the transceiver 11, directly refer to related descriptions of the terminal device in the method embodiment shown in FIG. 3. Details are not repeated herein.

Figure 8:
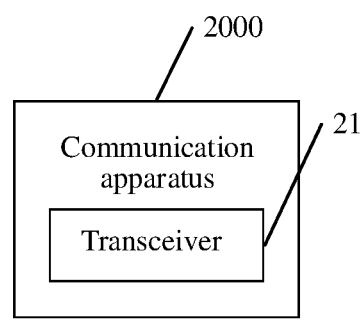
FIG. 8 is a schematic structural diagram of another communications apparatus according to an embodiment of this application.

Based on a same concept of the communication method in the foregoing embodiments, as shown in FIG. 8, an embodiment of this application further provides a communications apparatus 2000. The communications apparatus 2000 may be applied to the communication method shown in FIG. 3. The communications apparatus 2000 may be the network device 100 shown in FIG. 2, or may be a component (for example, a chip) applied to the network device 100. The communications apparatus 2000 includes a transceiver 21.

The transceiver 21 is configured to send a discovery reference signal to a terminal device, where the discovery reference signal includes one or more first signals, and the discovery reference signal further includes one or more second signals; and the one or more first signals include at least a common signal block or a channel state information-reference signal (CSI-RS). Whether the discovery reference signal includes the one or more second signals is configurable.

The one or more first signals carry configuration information of the one or more second signals, and the configuration information is used to indicate at least whether the discovery reference signal includes the one or more second signals, or the configuration information is used to indicate at least a type of the one or more second signals included in the discovery reference signal.

For more detailed description of the transceiver 21, directly refer to related descriptions of the network device in the method embodiment shown in FIG. 3. Details are not repeated herein.

Figure 9:
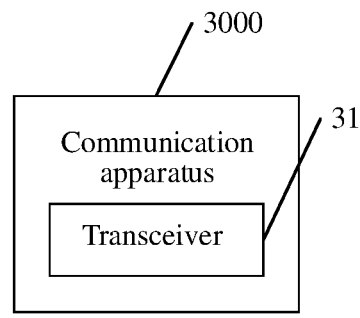
FIG. 9 is a schematic structural diagram of still another communications apparatus according to an embodiment of this application.

Based on a same concept of the communication method in the foregoing embodiments, as shown in FIG. 9, an embodiment of this application further provides a communications apparatus 3000. The communications apparatus may be applied to the communication method shown in FIG. 6. The communications apparatus 3000 may be the terminal device 200 shown in FIG. 2, or may be a component (for example, a chip) applied to the terminal device 200. The communications apparatus 3000 includes a transceiver 31.

The transceiver 31 is configured to receive configuration information of a discovery reference signal from a network device, where the discovery reference signal includes one or more first signals, and the discovery reference signal further includes one or more second signals; and the one or more first signals include at least a common signal block or a channel state information-reference signal (CSI-RS). Whether the discovery reference signal includes the one or more second signals is configurable. The configuration information is used to indicate at least whether the discovery reference signal includes the one or more second signals, or the configuration information of the discovery reference signal is used to indicate at least a type of the one or more second signals included in the discovery reference signal.

The transceiver 31 is further configured to receive the discovery reference signal from the network device based on the configuration information of the discovery reference signal.

In an implementation, the transceiver 31 is configured to receive downlink control information from the network device, where the downlink control information carries the configuration information of the discovery reference signal.

In another implementation, the transceiver 31 is configured to receive the downlink control information through a common control channel of the one or more second signals.

For more detailed description of the transceiver 31, directly refer to related descriptions of the terminal device in the method embodiments shown in FIG. 6. Details are not repeated herein.

Figure 10:
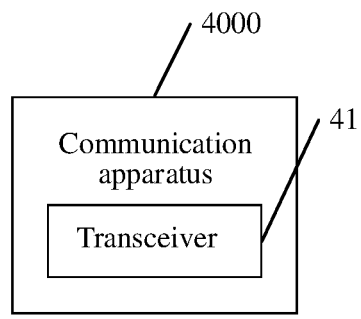
FIG. 10 is a schematic structural diagram of still another communications apparatus according to an embodiment of this application.

Based on a same concept of the communication method in the foregoing embodiments, as shown in FIG. 10, an embodiment of this application further provides a communications apparatus 4000. The communications apparatus may be applied to the communication method shown in FIG. 6. The communications apparatus 4000 may be the network device 100 shown in FIG. 2, or may be a component (for example, a chip) applied to the network device 100. The communications apparatus 4000 includes a transceiver 41.

The transceiver 41 is configured to send configuration information of a discovery reference signal to a terminal device, where the discovery reference signal includes one or more first signals, and the discovery reference signal further includes one or more second signals; and the first signal includes at least a common signal block or a channel state information-reference signal (CSI-RS). Whether the discovery reference signal includes the second signal is configurable. The configuration information is used to indicate at least whether the discovery reference signal includes the second signal, or the configuration information is used to indicate at least a type of the second signal included in the discovery reference signal.

The transceiver 41 is further configured to send the discovery reference signal to the terminal device based on the configuration information of the discovery reference signal.

In an implementation, the transceiver 41 is configured to send downlink control information to the terminal device, where the downlink control information carries the configuration information of the discovery reference signal.

In another implementation, the transceiver 41 is configured to send the downlink control information to the terminal device through a common control channel of the one or more second signals.

For more detailed descriptions of the transceiver 41, directly refer to related descriptions of the network device in the method embodiment shown in FIG. 6. Details are not repeated herein.

An embodiment of this application further provides a communications apparatus. The communications apparatus is configured to perform the foregoing communication method. A part or all of the foregoing communication method may be implemented by hardware, or may be implemented by software.

Optionally, in specific implementation, the communications apparatus may be a chip or an integrated circuit.

Optionally, when a part or all of the communication method in the foregoing embodiments is implemented by software, the communications apparatus includes a memory, configured to store a program; and a processor, configured to execute the program stored in the memory. When the program is executed, the communications apparatus is enabled to implement the communication methods provided in the foregoing embodiments.

Optionally, the memory may be a physically independent unit, or may be integrated with the processor.

Optionally, when a part or all of the communication methods in the foregoing embodiments are implemented by software, the communications apparatus may alternatively include only a processor. A memory for storing a program is located outside the communications apparatus, and the processor is connected to the memory by using a circuit/line, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may include a volatile memory, for example, a random-access memory (RAM). The memory may also include a non-volatile memory, for example, a flash memory, a hard disk drive (HDD), or a solid-state drive (SSD). The memory may further include a combination of the foregoing types of memories.

Figure 11:
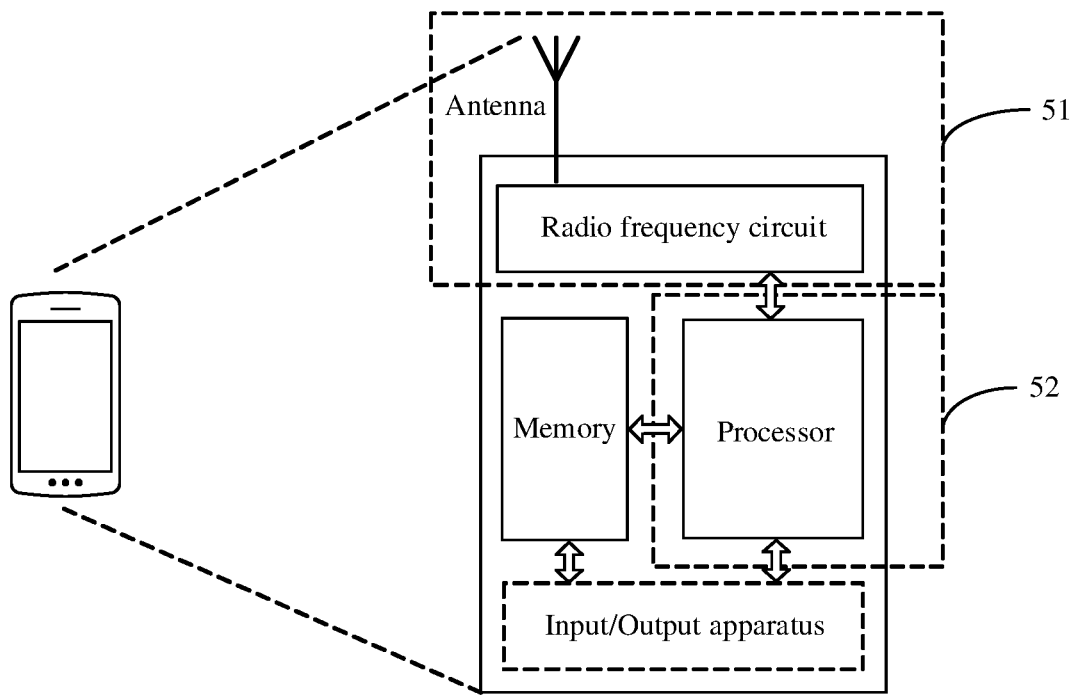
FIG. 11 is a schematic structural diagram of still another communications apparatus according to an embodiment of this application.

FIG. 11 is a simplified schematic structural diagram of a terminal device. For ease of understanding and ease of illustration, in FIG. 11, a mobile phone is used as an example of the terminal device. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to perform conversion between a baseband signal and a radio frequency signal and process the radio frequency signal. The antenna is mainly configured to receive and transmit an RF signal in a form of an electromagnetic wave. An input/output apparatus, such as a touchscreen, a display screen, or a keyboard, is mainly configured to receive data entered by a user and output data to the user. It should be noted that some types of terminal devices may have no input/output apparatus.

When data needs to be sent, after performing baseband processing on the to-be-sent data, the processor outputs a baseband signal to a radio frequency circuit, and the radio frequency circuit performs radio frequency processing on the baseband signal and then sends a radio frequency signal in a form of an electromagnetic wave to the outside by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data and processes the data. For ease of description, FIG. 11 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in embodiments of this application.

In this embodiment, the antenna and the radio frequency circuit that have a transceiver function may be considered as a receiving unit and a sending unit (which may also be collectively referred to as a transceiver) of the terminal device, and the processor having a processing function may be considered as a processing unit of the terminal device. As shown in FIG. 11, the terminal device includes a transceiver 51 and a processing unit 52. The transceiver 51 may also be referred to as a receiver/sender (transmitter), a receiver/transmitter machine, a receiver/transmitter circuit, or the like. The processing unit 52 may also be referred to as a processor, a processing board, a processing module, a processing apparatus, or the like.

For example, in an embodiment, the transceiver 51 is configured to perform a function of the terminal device in step S101 in the embodiment shown in FIG. 3.

For another example, in another embodiment, the transceiver 51 is configured to perform functions of the terminal device in steps S201 and S202 in the embodiment shown in FIG. 6.

Figure 12:
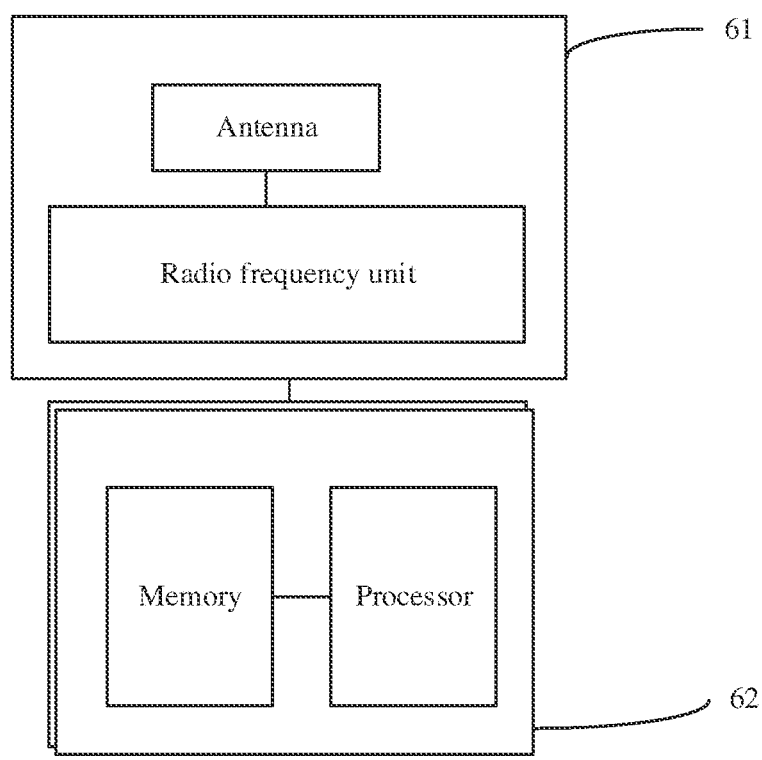
FIG. 12 is a schematic structural diagram of still another communications apparatus according to an embodiment of this application.

FIG. 12 is a simplified schematic structural diagram of a network device. The network device includes a radio frequency signal transceiver and conversion part and a part 62. The radio frequency signal transceiver and conversion part further includes a transceiver part 61. The radio frequency signal transceiver and conversion part is mainly configured to receive and transmit an RF signal and perform conversion between an RF signal and a baseband signal. The part 62 is mainly configured to perform baseband processing, control the network device, and the like. The transceiver 61 may also be referred to as a receiver/sender (transmitter), a receiver/transmitter machine, a receiver/transmitter circuit, or the like. The part 62 is usually a control center of the network device, and may be usually referred to as a processing unit, configured to control the network device to perform the steps performed by the network device in FIG. 3 or FIG. 6. For details, refer to the descriptions in the foregoing related parts.

The part 62 may include one or more boards. Each board may include one or more processors and one or more memories. The processor is configured to read and execute a program in the memory to implement a baseband processing function and control a network device. If there are a plurality of boards, the boards may be interconnected to improve a processing capability. In an optional implementation, a plurality of boards may share one or more processors, or a plurality of boards share one or more memories, or a plurality of boards simultaneously share one or more processors.

In an embodiment, the transceiver 61 is configured to perform a function of the network device in step S101 in the embodiment shown in FIG. 3.

In another embodiment, the transceiver 61 is configured to perform functions of the network device in steps S201 and S202 in the embodiment shown in FIG. 6.

An embodiment of this application further provides a computer readable storage medium. The computer readable storage medium stores a computer program or instructions. When the computer program or the instructions are executed, the methods in the foregoing aspects are implemented.

An embodiment of this application further provides a computer program product including one or more instructions. When the one or more instructions are run on a computer, the computer is enabled to perform the methods in the foregoing aspects.

An embodiment of this application further provides a communications system, including the foregoing communications apparatus.

It may be clearly understood by a person skilled in the art that, for the purpose of convenient and brief description, for a detailed working process of the foregoing system, apparatus, and unit, refer to a corresponding process in the foregoing method embodiments, and details are not repeated herein.

In the embodiments provided in this application, it should be understood that the disclosed system, apparatus, and method may be implemented in other manners. For example, the division into units is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid-state drive (solid-state disk, SSD).

What is claimed is:

1. A communication method, comprising:
receiving a discovery reference signal from a network device, wherein the discovery reference signal comprises one or more first signals and one or more second signals, and the one or more first signals comprise at least a common signal block or a channel state information-reference signal (CSI-RS), the one or more first signals carry configuration information of the one or more second signals, and the configuration information of the one or more second signals is indicative of at least whether the discovery reference signal comprises the one or more second signals, or indicative of at least a type of the one or more second signals comprised in the discovery reference signal,
wherein the one or more second signals comprise other system information (OSI) determined according to a predetermined rule.

2. The communication method according to claim 1, wherein the one or more second signals u comprise one or more of: remaining minimum system information (RMSI), a paging message, or a random access response.

3. The communication method according to claim 2, wherein the one or more second signals further comprise one or more of: a control channel of the remaining minimum system information (RMSI), a control channel of the other system information (OSI), a control channel of the paging message, or a control channel of the random access response.

4. The communication method according to claim 1, wherein a sequence initialization value or a sequence cyclic shift value of the CSI-RS included in the one or more first signals carries the configuration information of the one or more second signals.

5. The communication method according to claim 1, wherein the common signal block included in the one or more first signals comprises a demodulation reference signal of a physical broadcast channel; and a sequence initialization value or a sequence cyclic shift value of the demodulation reference signal of the physical broadcast channel carries the configuration information of the one or more second signals.

6. The communication method according to claim 1, wherein the common signal block included in the one or more first signals comprises a physical broadcast channel; and
 a payload of the physical broadcast channel carries the configuration information of the one or more second signals.

7. The communication method according to claim 1, wherein the common signal block included in the one or more first signals comprises a physical broadcast channel; and a payload of the physical broadcast channel carries a mapping pattern of the one or more first signals and the one or more second signals.

8. The communication method according to claim 1, wherein the one or more first signals further comprise remaining minimum system information (RMSI); the one or more second signals further comprise at least one of a paging message, or a random access response; and the RMSI carries the configuration information of the one or more second signals.

9. The communication method according to claim 1, wherein the predetermined rule complies with that a priority of on-demand OSI of a terminal device is higher than that of non-on-demand OSI.

10. The communication method according to claim 1, wherein the one or more second signals comprise paging message, the paging message is determined according to a rule complying with that a priority of a short paging message is higher than that of a normally scheduled paging message.

11. The communication method according to claim 1, wherein the one or more first signals carry information indicating a specific second signal included in the discovery reference signal, and a quantity of second signals included in the discovery reference signal.

12. A communication method, comprising:
 receiving configuration information of a discovery reference signal from a network device, wherein the discovery reference signal comprises one or more first signals and one or more second signals, the one or more first signals comprise at least a common signal block or a channel state information-reference signal (CSI-RS), and the configuration information of the discovery reference signal is indicative of at least whether the discovery reference signal comprises the one or more second signals, or indicative of at least a type of the one or more second signals comprised in the discovery reference signal; and
 receiving the discovery reference signal from the network device based on the configuration information of the discovery reference signal,
 wherein the one or more second signals comprise other system information (OSI) determined according to a predetermined rule.

13. The communication method according to claim 12, wherein receiving the configuration information of the discovery reference signal comprises:
 receiving downlink control information from the network device, wherein the downlink control information carries the configuration information of the discovery reference signal.

14. The communication method according to claim 13, wherein receiving the downlink control information from the network device comprises:
 receiving the downlink control information through a common control channel of the one or more second signals.

15. A communication method, comprising:
 sending configuration information of a discovery reference signal to a terminal device, wherein the discovery reference signal comprises one or more first signals, and one or more second signals; the one or more first signals comprise at least a common signal block or a channel state information-reference signal (CSI-RS); and the configuration information of the discovery reference signal is indicative of at least whether the discovery reference signal comprises the one or more second signals, or indicative of at least a type of the one or more second signals comprised in the discovery reference signal; and
 sending the discovery reference signal to the terminal device based on the configuration information of the discovery reference signal,
 wherein the one or more second signals comprise other system information (OSI) determined according to a predetermined rule.

16. The communication method according to claim 15, wherein sending the configuration information of the discovery reference signal to the terminal device comprises:
 sending downlink control information to the terminal device, wherein the downlink control information carries the configuration information of the discovery reference signal.

17. The communication method according to claim 16, wherein sending the downlink control information to the terminal device comprises:
 sending the downlink control information to the terminal device through a common control channel of the one or more second signals.

\* \* \* \* \*

UNITED STATES PATENT AND TRADEMARK OFFICE
CERTIFICATE OF CORRECTION

| | | |
|---|---|---|
| PATENT NO. | : 12,015,572 B2 | Page 1 of 1 |
| APPLICATION NO. | : 17/213559 | |
| DATED | : June 18, 2024 | |
| INVENTOR(S) | : Jianqin Liu | |

It is certified that error appears in the above-identified patent and that said Letters Patent is hereby corrected as shown below:

In the Claims

Column 22, Claim 2, Line 2, change "signals u" to --signals further--.

Signed and Sealed this
Sixteenth Day of July, 2024

Katherine Kelly Vidal
*Director of the United States Patent and Trademark Office*